No. 610,164. Patented Sept. 6, 1898.
J. BRANAGAN.
WEED CUTTER.
(Application filed Jan. 10, 1898.)
(No Model.) 2 Sheets—Sheet 1.
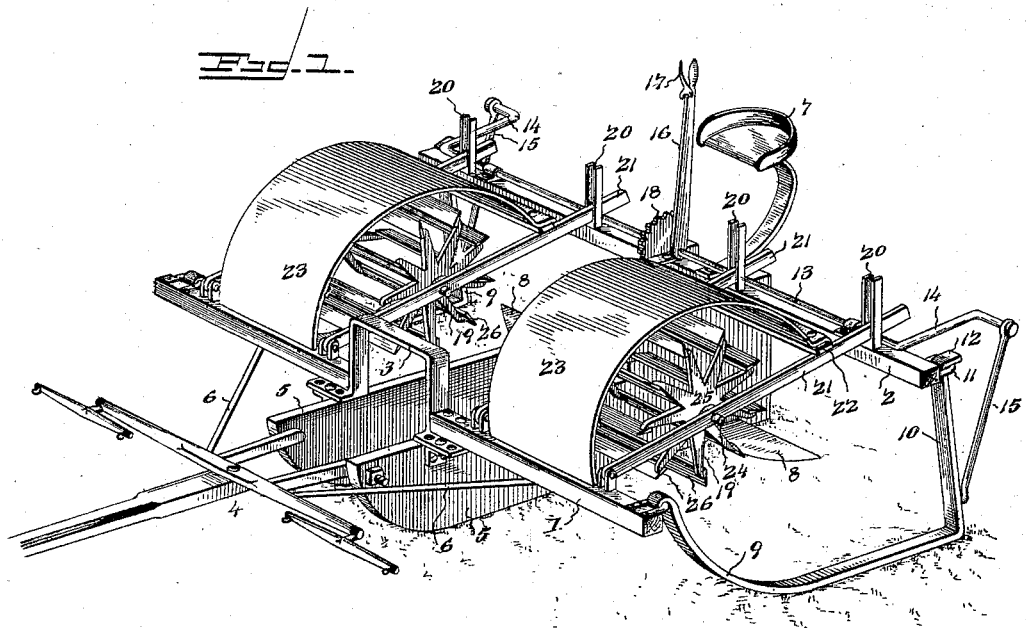
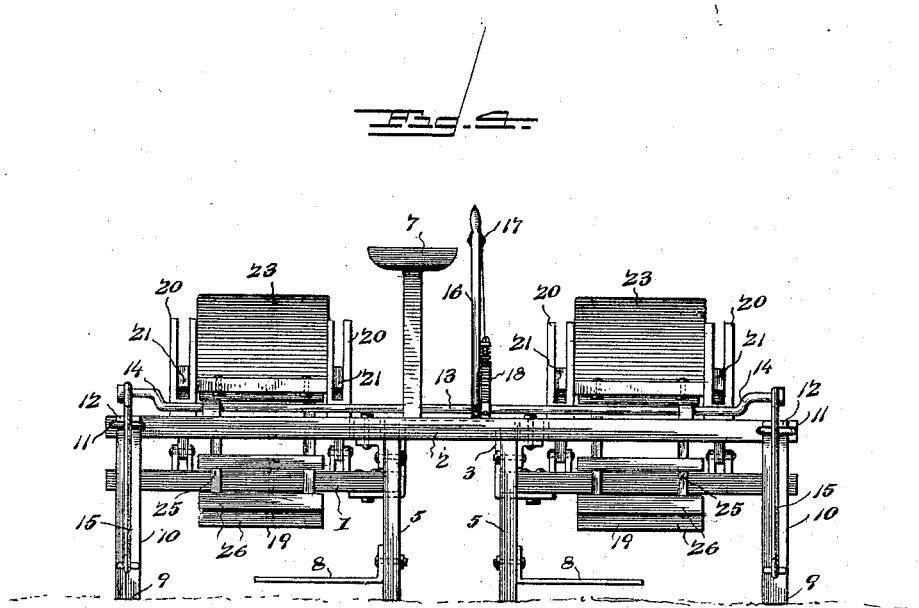
Witnesses
E. K. Stewart.
V. B. Hillyard.
By WD's Attorneys,
James Branagan
Inventor
C. A. Snow & Co.

No. 610,164. Patented Sept. 6, 1898.
J. BRANAGAN.
WEED CUTTER.
(Application filed Jan. 10, 1898.)
(No Model.) 2 Sheets—Sheet 2.
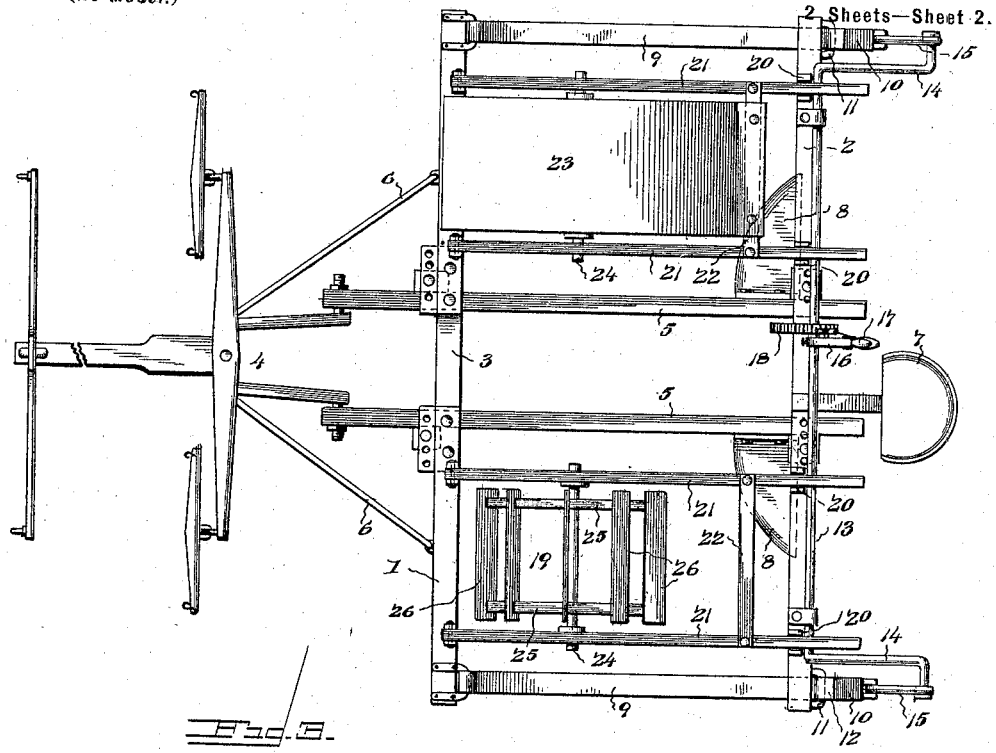
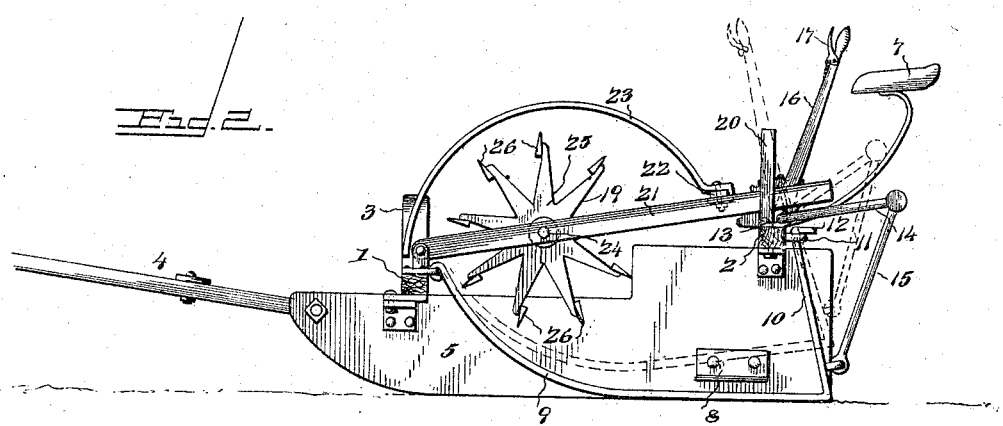
Witnesses
E. H. Stewart
V. B. Hillyard
James Branagan
Inventor
By his Attorneys,
C. A. Snow & Co.

UNITED STATES PATENT OFFICE.

JAMES BRANAGAN, OF MAYVIEW, KANSAS.

WEED-CUTTER.

SPECIFICATION forming part of Letters Patent No. 610,164, dated September 6, 1898.

Application filed January 10, 1898. Serial No. 666,225. (No model.)

*To all whom it may concern:*

Be it known that I, JAMES BRANAGAN, a citizen of the United States, residing at Mayview, in the county of Jewell and State of Kansas, have invented a new and useful Weed-Cutter, of which the following is a specification.

This invention is designed to provide a machine for destroying weeds and other objectionable growths in listed corn, the machine depending for its operation upon rotary cutting-cylinders which travel upon opposite sides of the rows and destroy the weeds by cutting them down.

In its organization the machine comprises inner and outer runners, the outer runners being movable, so as to be lowered to carry the machine when turning it prior to recrossing the field or when moving from one place to another, and adapted to be elevated to admit of the cutting-cylinders coming into action to attain the end aforesaid. Rotary cutting-cylinders are journaled to frames which are pivotally supported at one end and adapted to move vertically at the opposite end to admit of the cylinders adapting themselves to the condition of the surface over which the machine is drawn. These cutting-cylinders are located between the inner and outer runners and upon opposite sides of a medial line.

For a full understanding of the merits and advantages of the invention reference is to be had to the accompanying drawings and the following description.

The improvement is susceptible of various changes in the form, proportion, and the minor details of construction without departing from the principle or sacrificing the advantages thereof, and to a full disclosure of the invention an adaptation thereof is shown in the accompanying drawings, in which—

Figure 1 is a perspective view of a weed-cutter constructed in accordance with and embodying the vital features of this invention. Fig. 2 is a side elevation, the dotted lines indicating the position of the outer runners when elevated. Fig. 3 is a top plan view, one of the shields for the cutting-cylinders being omitted. Fig. 4 is a rear view.

Corresponding and like parts are referred to in the following description and indicated in all the views of the drawings by the same reference characters.

The frame of the machine comprises a front transverse bar 1 and a rear bar 2, the forward bar having its middle portion arched, as shown at 3, to provide clearance for the plants when drawing the machine over the field and the end portions of the bar 1 being in a lower plane than the bar 2. The pole or tongue 4 has pivotal connection at its inner end with the front ends of the runners 5, and braces or hounds 6 connect the pole a short distance from its pivotal end with the end portions of the bar 1. The pole or tongue is a single continuous piece from the doubletrees to the neck-yoke, and it is supplied with the usual neck-yoke and doubletree, to which a team is hitched in the ordinary manner. The seat 7 is attached to the middle portion of the rear bar 2 and comes opposite the space formed between the runners 5.

The inner runners 5 have adjustable connection with the front and rear bars 1 and 2 in any desired manner, so as to admit of them being brought closer together or separated, as required, to suit the size of the plants to be protected when the machine is in operation. The rear end portions of the runners 5 are extended vertically to the requisite height, so as to support the rear bar 2 and afford ample protection for the plants and prevent the weeds being thrown thereon. Knives 8 are secured to the rear ends of the runners 5 a short distance from their lower edges and project laterally and are intended to cut down weeds close to the sides of the runners 5.

The outer runners 9 have pivotal connection at their front ends with the extremities of the bar 1, and their rear ends are formed to provide uprights 10, which have loose connection with the extremities of the bars 2, so as to admit of the rear portion of the runners moving vertically. These outer runners are preferably formed from a bar of wrought-iron having its front end curled to form a sleeve which is looped into a staple applied to the bar 1 and having its rear portion bent to extend in an upward direction and work loosely in a guide, staple, or keeper 11, by means of which the rear portion of the runner is directed in its vertical movements and held in place. The upper extremities of the uprights 10 are bent, forming stops 12, which engage with the guides or keepers 11 and prevent the disengagement therefrom of the uprights 10, thereby limiting the downward movement of the runners 9 at their rear ends. A shaft 13 is journaled in bearings provided on the rear bar 2 and is formed with end cranks 14, which are connected by links 15 with the lower ends of the uprights 10, whereby upon turning the shaft 13 in its bearings the rear ends of the runners 9 will be raised or lowered, according to the direction of turning the shaft. An operating-lever 16 is secured to the shaft 13 and is within convenient reach of the driver's seat 7, thereby enabling the rear ends of the runners 9 to be elevated or lowered at will. This lever 16 is provided with a hand-latch 17 of ordinary construction, which coöperates with a notched segment 18, by means of which the lever and the runners 9 are held in an adjusted position.

The frames bearing the rotary cutting-cylinders 19 have pivotal connection at their front ends with the end portions of the forward transverse bar 1, and their rear ends are adapted to move vertically, being free and unrestrained, and are directed in their movements by guides 20. Each of the pivoted frames consists of longitudinal bars 21 and a connecting cross-bar 22. The longitudinal bars 21 have pivotal connection at their front ends with the bar 1 in any convenient and substantial manner, and their rear ends operate in the spaces formed between the members comprising the guides 20. The shields 23, covering the upper portion of the rotary cutting-cylinders 19, are bolted at their rear ends to the cross-bars 22 and are designed to prevent injury to the driver or other person. The rotary cutting-cylinders 19 consist of a shaft 24, journaled at its ends in the longitudinal bars 21, heads 25, comprising arms or spokes, and knives or cutters 26, secured to the outer ends of the arms of the heads 25 and extending transversely of the machine in parallel relation.

The parts of my machine are arranged and proportioned for the inner runners 5 5 to travel between the rows of corn in the deepest part of the space between the ridges or lists, and the runners are adapted to penetrate the ground to a certain extent. The cutter-cylinders are journaled on the pivoted frames which are hung on the front cross-bar, that occupies a lower horizontal plane than the rear cross-bar, and the height of the front cross-bar above the lower edges of the inner runners is such that the cutter-cylinders are presented to the sides of the ridges when the machine is drawn between the latter.

In operation the runners 5 5 travel in the space between the furrows and penetrate the ground sufficiently to lower the cutter-cylinders for the latter to have contact with the sides of the ridges and the weeds growing thereon, and as the machine is drawn in a forward direction the cutter-cylinders are rotated to cut the weeds, said runners 5 5 serving to hold the machine against lateral deflection. When turning the machine at the end of a furrow or in moving the machine from one field or place to another, the outer runners are lowered by adjusting the rock-shaft through the hand-lever, and thereby bringing the lower edges or treads of the outer runners in the same horizontal plane as the corresponding edges of the inner runners. This adjustment of the outer runners offers resistance to the sinking of the machine and the inner runners into the ground for a distance sufficient to bring the cutter-cylinders close enough to cut the weeds, and the frame and cylinders are thus raised sufficiently for the cylinders to clear the ground and the weeds on the sides of the ridges. In the service of the machine the outer runners are raised far enough for their lower edges or tread-surfaces to entirely clear the ground and allow the inner runners to entirely support the machine. As these inner runners are arranged on opposite sides of the medial line of the machine and penetrate the ground between the ridges and as the cylinders have engagement with the ridges, the machine is properly supported in condition for active service in relation to the ridges.

Having thus described the invention, what is claimed as new, and desired to be secured by Letters Patent, is—

1. In an agricultural implement, the combination with the frame bearing operating mechanism, of inner and outer runners and means for raising and lowering corresponding runners to throw the operating mechanism into and out of action as required, substantially in the manner set forth.

2. In an agricultural implement, the combination with the frame bearing operating mechanism, of inner and outer runners, the latter being pivoted at one end to the frame, and means for raising and lowering the pivoted runners at their free ends, substantially as and for the purpose specified.

3. In an agricultural implement, the combination with the frame bearing the operating mechanism, of runners having pivotal connection at one end with the frame and having their opposite ends provided with uprights and adapted to move in guides provided on the frame, and means for raising and lowering the said runners at their free ends, substantially as set forth.

4. In an agricultural implement, the combination with the frame bearing the operating mechanism, of runners pivoted to the frame at one end, uprights at the opposite end of the runners adapted to operate in guides of the frame and having stops at their upper ends to limit the downward movement of the runners, and means for raising and lowering the runners at their free ends, substantially as and for the purpose described.

5. In an agricultural implement, the combination with the frame bearing an operating mechanism, inner and outer runners, the latter pivoted at their front ends to the frame and having uprights at their front ends passing loosely through guides of the frame, a shaft having crank portions connected with the outer runners, and means for turning the shaft to raise or lower the runners at their free ends and secure the shaft and runners in a located position, substantially as specified.

6. In combination, a frame, inner and outer runners, and a cutting mechanism mounted between the runners and adapted to have a free vertical movement to adapt itself to the surface condition of the ground over which the implement is drawn, substantially as set forth.

7. In combination, a frame, inner and outer runners, a cutting mechanism located in the space formed between the runners and adapted to have a free vertical movement, and means for raising and lowering a set of runners, substantially as described.

8. In combination, a frame having pivotal connection at its front end with a frame-bar and bearing a cutting mechanism, and vertical guides for directing the pivoted frame in its vertical movements, substantially as specified.

9. In a weed-cutter, the combination of front and rear transverse bars, connections between these bars, connected longitudinal bars having pivotal connection at their front ends with the forward transverse bar, vertical guides applied to the rear transverse bar and receiving the rear ends of the longitudinal bars to direct them in their vertical movement, and a cutting mechanism applied to the longitudinal bars and movable therewith, substantially as set forth.

10. In a weed-cutter, the combination of a front transverse bar having an arch intermediate of its ends, a rear transverse bar, runners having adjustable connection with the transverse bars so as to be spaced a greater or less distance apart, outer runners having pivotal connection at their front ends with the forward transverse bar and adjustably connected at their rear ends with the rear transverse bar, frames bearing rotary cutting-cylinders pivoted to the aforesaid front transverse bar, and guides applied to the said rear transverse bar and receiving the rear portions of the pivoted frames to direct them in their vertical movements, substantially as specified.

11. In a weed-cutter, the combination of front and rear transverse bars, the front bar having an arch intermediate of its ends, inner runners having their rear ends extended vertically, outer runners pivoted at their front ends to the forward transverse bar and movable vertically at their rear ends, a shaft under the control of the driver and having crank portions in connection with the pivoted runners for raising and lowering them, knives projecting laterally from the rear ends of the inner runners, frames bearing rotary cutting-cylinders having pivotal connection with the aforesaid forward transverse bar, guides applied to the rear transverse bar for directing the pivoted frames in their vertical movements, and shields applied to the pivoted frames and extending over the upper portion of the rotary cutting-cylinders, substantially as and for the purpose set forth.

In testimony that I claim the foregoing as my own I have hereto affixed my signature in the presence of two witnesses.

JAMES BRANAGAN.

Witnesses:
T. B. VALLETTO,
J. S. ALLEN.